United States Patent
Stedron et al.

(10) Patent No.: US 6,207,933 B1
(45) Date of Patent: Mar. 27, 2001

(54) STOVE TOP ASSEMBLY AND RELATED METHOD

(75) Inventors: Horst Stedron, Herborn; Bernd Schultheiss, Schwabenheim; Werner Hottum, Bechenheim, all of (DE)

(73) Assignee: Schott Glasswerke, Mainz (DE)

( * ) Notice: Subject to any disclaimer, the term of this patent is extended or adjusted under 35 U.S.C. 154(b) by 0 days.

(21) Appl. No.: 09/014,077

(22) Filed: Jan. 27, 1998

(30) Foreign Application Priority Data

Jan. 31, 1997 (DE) .............................................. 197 03 269

(51) Int. Cl.[7] .................................................... H05B 3/68
(52) U.S. Cl. ...................................................... 219/452.11
(58) Field of Search ........................... 219/451.1, 452.11, 219/452.12, 460.1, 461.1, 465.1, 466.1; 126/39 H, 211, 214 A; 99/422

(56) References Cited

U.S. PATENT DOCUMENTS

| | | | |
|---|---|---|---|
| 4,476,159 | * 10/1984 | Mead et al. | 427/136 |
| 4,492,217 | * 1/1985 | Scheidler | 219/452.11 |
| 5,183,996 | * 2/1993 | Hazan et al. | 219/452.11 |
| 5,185,047 | * 2/1993 | Ray | 219/452.11 |
| 5,317,129 | * 5/1994 | Taplan et al. | 219/452.11 |
| 5,571,434 | * 11/1996 | Cavener et al. | 219/452.11 |
| 5,738,979 | * 4/1998 | Antoine | 99/422 |
| 5,893,359 | * 4/1999 | Schultheis et al. | 219/214 A |

FOREIGN PATENT DOCUMENTS

3126013 C2    4/1983    (DE) .

* cited by examiner

Primary Examiner—Sang Paik
(74) Attorney, Agent, or Firm—Jansson, Shupe, Bridge & Munder, Ltd.

(57) ABSTRACT

A stove top assembly comprises a cooking plate having a perimeter portion and a mounting frame around the perimeter portion. In the improvement, the frame includes a lateral carrier member and an upstanding retention member extending extending away from the carrier member. The retention member and the perimeter portion define an upwardly-opening space therebetween and foam substantially fills the space and adheres to the retention member and to the perimeter portion, thereby affixing the plate and the frame to one another. A new method for making a stove top assembly includes positioning the cooking plate in the mounting frame to define an upwardly-opening space around the perimeter portion and between the perimeter portion and the retention member. Substantially all of the space is filled with reactive adhesive foam, thereby affixing the cooking plate and the mounting frame to one another.

18 Claims, 3 Drawing Sheets

STOVE TOP ASSEMBLY AND RELATED METHOD

RELATED APPLICATION

This application claims priority from German application no. DE 197 03 269.9-16 filed in the Federal Republic of Germany on Jan. 31, 1997.

FIELD OF THE INVENTION

This invention relates generally to stoves and, more particularly, to stove tops used for cooking in, e.g., households, food service establishments and the like.

BACKGROUND OF THE INVENTION

Commonly, stoves are configured for use with gas or electric burners exposed through openings in the top cooking plate. A more recent innovation involves "smooth top" stoves, i.e., stoves having electric burners mounted beneath an imperforate, substantially flat cooking plate made of special, high-temperature glass.

Irrespective of the specific type of burner and configuration of the cooking plate, it is common to mount the cooking plate to the supporting stove structure by means of some type of frame. At the least, the frame covers and masks the edges of the stove structure and the cooking plate and provides a finished product of attractive appearance.

One approach to cooking plate mounting is disclosed in German patent document DE 31 26 013 C2. Such document discloses a substantially flat cooking plate which is made of glass ceramic and which adheres to a frame. During manufacture, portions of the frame are coated with silicone adhesive and the cooking plate is then placed against the adhesive. Excess adhesive is displaced by plate placement and after a predetermined hardening time, the plate and the frame adhere firmly to one another. The resulting assembly can be handled as a unitary structure.

While such cooking plate mounting arrangements have been generally satisfactory, they are not without disadvantages. One disadvantage of the arrangement disclosed in the above-noted German patent document is that the excess adhesive that has been displaced during plate placement must then be removed during post-processing stages. This operation take time and translates into increased manufacturing cost and, of course, higher consumer prices.

A corollary disadvantage of the aforedescribed arrangement is that there is no way to prevent the excess adhesive from being displaced. The adhesive "oozes" unrestrained.

Another disadvantage of the arrangement disclosed in the above-noted German patent document is that proper positioning of the plate and the frame to one another must be performed while the adhesive is hardening. Most desirably, a two-component, rapidly hardening adhesive is used and there is little time to make precise positioning adjustment. Nor, of course, is there any way to reliably retain alignment, once achieved and if achieved.

A new mounting support and related method which addresses shortcomings of the prior art would be a distinct technological advance in the art.

OBJECTS OF THE INVENTION

It is an object of this invention to provide a stove top mounting support and related method which address some of the problems and shortcomings of the prior art.

Another object of this invention is to provide a stove top mounting support and related method which help reduce manufacturing costs.

Another object of this invention is to provide a stove top mounting support and related method which avoid post-assembly removal of excess adhesive.

Yet another object of this invention is to provide a stove top mounting support and related method which restrain the adhesive joining the frame and plate from free-flowing to unwanted locations.

Another object of this invention is to provide a stove top mounting support and related method which permit relative plate-and-frame positioning prior to adhesive application.

Still another object of this invention is to provide a stove top mounting support and related method which retains the selected plate-and-frame positioning during adhesive application. How these and other objects are accomplished will be apparent from the following descriptions and from the drawings.

SUMMARY OF THE INVENTION

The invention involves a stove top assembly comprising a relatively thin, substantially flat cooking plate of the type made of high-temperature glass, glass ceramic or the like. The plate has a perimeter portion and there is a mounting frame around such portion.

In the improvement, the frame includes a lateral, generally horizontal carrier member and a wall-like upstanding retention member extending away from the carrier member. The plate and the frame and its retention member are cooperatively sized so that the retention member and the perimeter portion define an upwardly-opening space between them. Foam substantially fills the space and adheres to the retention member and to the perimeter portion, thereby affixing the plate and the frame to one another.

The preferred foam is a reactive foam having plural constituents mixed together and expanded to substantially fill the space. The frame includes at least one opening for injecting the foam through such frame and into the space.

In a preferred embodiment, the plate is spaced above the carrier member and the foam is between the plate and the carrier member and adheres to the carrier member. In a more specific embodiment, the foam substantially fills the space to a level slightly below the top surface of the cooking plate.

In another aspect of the invention, the carrier member includes a groove formed in it. A sealing element is in the groove and contacts the plate and the foam adheres to the sealing element.

When making the stove top assembly, it has been found desirable to use a specially-configured manufacturing tool to do so. One embodiment of a preferred tool has a slab-like body component and a foot-like tool support member extending downwardly therefrom. The support member has a support surface substantially coplanar with the top surface and spanning the space. In a specific embodiment, both the space and the support member circumscribe a rectangle-shaped area.

In more specific aspects of the invention, the tool and the cooking plate top surface define a gap between them and a gasket is in the gap. In a specific embodiment, the gasket also circumscribes a rectangle-shaped area. The tool includes an evacuation channel in air flow communication with the gap and the gasket extends around the perimeter portion, thereby sealing the tool and the cooking plate with respect to one another.

In an alternate embodiment, the tool includes a resilient foot member extending downwardly from it and spanning the space. The perimeter portion of the cooking plate includes a chamfered upper edge and the foot member includes a lip sealing against the chamfered upper edge at a location below the plate top surface.

Another aspect of the invention involves a new method for making a stove top assembly. Such method includes providing a cooking plate having a perimeter portion and providing a mounting frame including a lateral carrier member and an upstanding retention member extending away from the carrier member. The cooking plate is positioned in the mounting frame to define an upwardly-opening space around the perimeter portion and between the perimeter portion and the retention member. Substantially all of the space is then filled with reactive adhesive foam, thereby affixing the cooking plate and the mounting frame to one another.

A more specific method includes providing a tool of the embodiment described above as having a support member, a support surface, a gasket and an evacuation channel. The filling step is preceded by the step of placing the support surface on the cooking plate top surface in a position whereby the support surface spans the space. Then air is evacuated from the gap through the channel so that the support surface is urged snugly against the cooking plate top surface and the retention member. The space is then filled with foam and the support surface (coacting with the carrier member and the retention member) constrains the foam within the space.

In an alternate method, the cooking plate is formed so that its perimeter portion has a chamfered upper edge. The tool has a resilient foot member and lip as described above. The filling step is preceded by the step of moving the tool to a position such that the foot member spans the space and the lip contacts the chambered upper edge below the top surface. Most preferably, the tool and the top surface define a gap therebetween, a gasket is in the gap and the tool includes an evacuation channel in air flow communication with the gap, all as described above. The moving step is followed by and the filling step is preceded by the step of evacuating air through the channel from the gap.

Other aspects of the invention recognize that, assuming the frame is held in a fixturing jig or the like, the cooking plate may have a propensity to move with respect to the frame during foam filling or during placement of the tool and foam filling. To positionally secure the cooking plate, the positioning step includes moving a positioning device in the space and, most preferably, includes moving a plurality of positioning devices, e.g., four devices, in the space so that each device abuts both the cooking plate and the retention member at each of four respective locations, one along each of the four linear borders of the cooking plate. In a highly preferred method, each positioning device is coupled to a hand-manipulated slide member extending through the frame.

A preferred foam is made of two non-foamed constituents which, when mixed, react by foaming and then hardening. A preferred foam is selected from a group of reaction foams such as polyurethane, silicone, ethylenepropylene diene monomer (EPDM—a terpolymer elastomer) and polytetrafluoroethylene (PTFE) foam. Each of these foams is adhesive and permanently elastic, thereby imparting a degree of resiliency to the way the cooking plate and frame are secured to one another.

Other details of the invention are set forth in the following detailed descriptions and in the drawings.

DETAILED DESCRIPTIONS OF PREFERRED EMBODIMENTS

Figure 1:
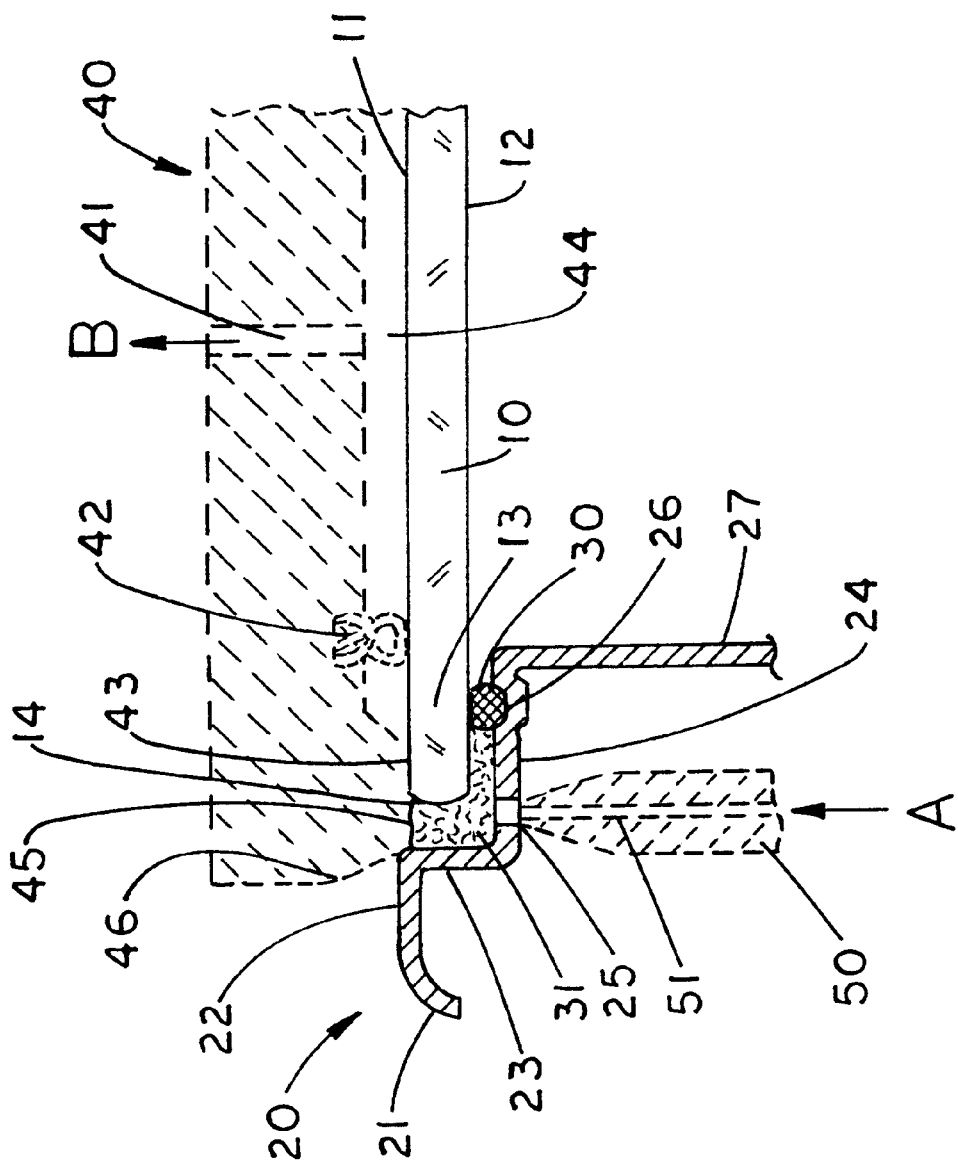
FIG. 1 is a cross-sectional elevation view of a portion of the new stove top assembly. Such assembly is shown in conjunction with one embodiment of a tool used in the manufacturing process. Parts are broken away and surfaces of parts are shown in dashed outline.
Figure 2:
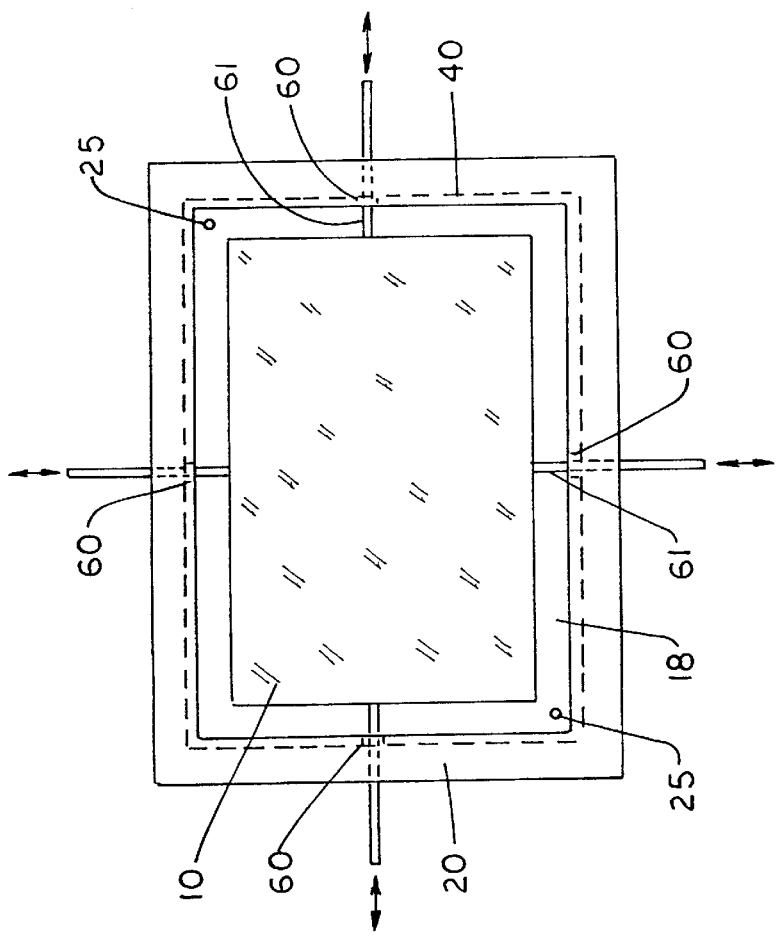
FIG. 2 is a representative top plan view of the stove top assembly shown in conjunction with cooking plate positioning devices and related slide members. Surfaces of parts are shown in dashed outline.
Figure 4:
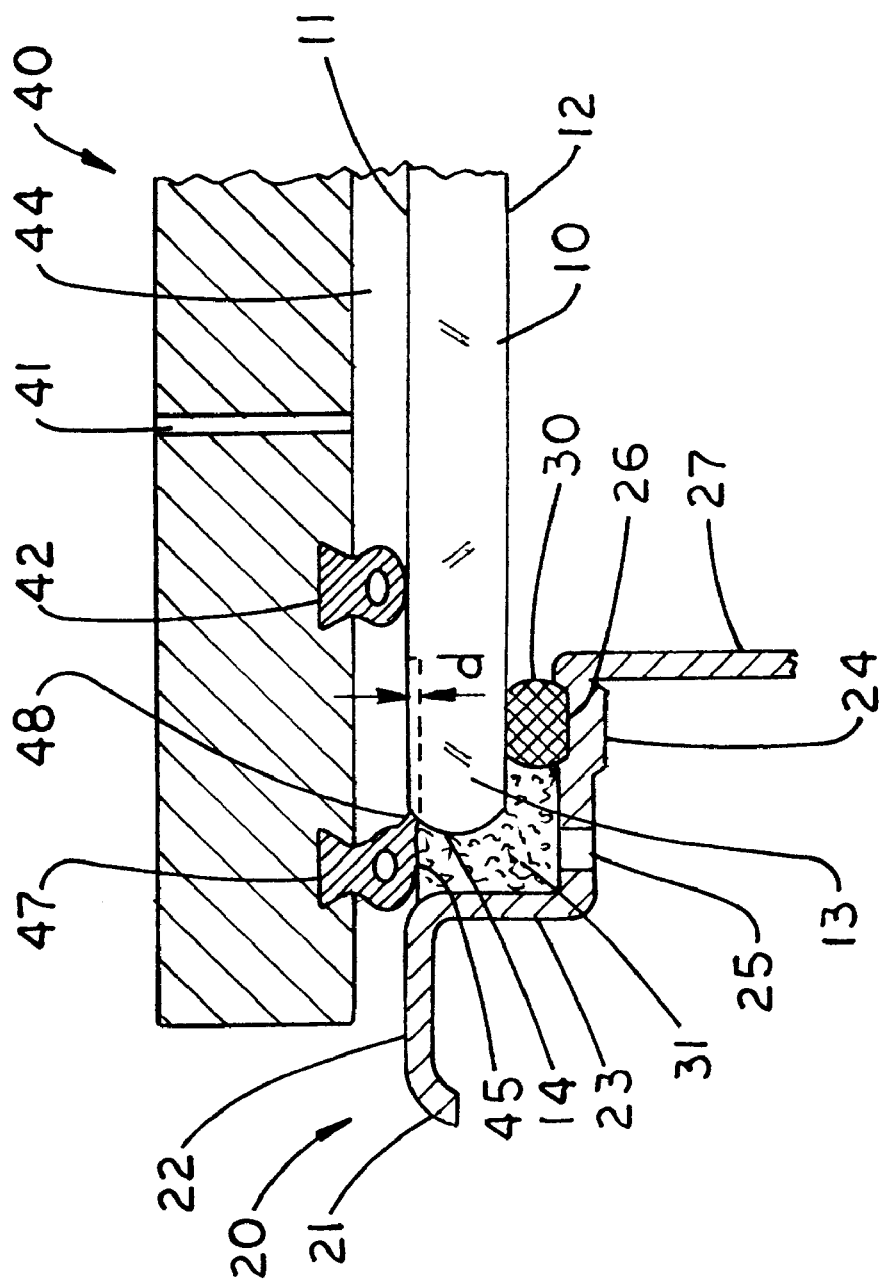
FIG. 4 is a cross-sectional elevation view of a portion of the new stove top assembly. Such assembly is shown in conjunction with another embodiment of a tool used in the manufacturing process. Parts are broken away and surfaces of parts are shown in dashed outline.

Referring first to FIGS. 1, 2 and 4, the stove top assembly has a relatively thin, substantially flat cooking plate 10 of the type made of high-temperature glass, glass ceramic or the like. The plate 10 has top and under surfaces 11, 12, respectively, and a perimeter portion 13. As is apparent from FIG. 2, the cooking plate 10 is generally rectangular in shape.

There is a mounting frame 20 around the perimeter portion 13 and such frame 20 includes a generally vertical carrier 27 and a generally horizontal carrier member 24 extending laterally from the carrier 27. An upstanding retention member 23 extends away from the carrier member 24 and is substantially vertical. A cross piece 22 extends laterally outwardly from the retention member 23 and such piece 22 terminates in a support rim 21.

When the assembly is installed in a cooking stove, such assembly is lowered into a top panel (not shown) that has an opening shaped like the frame 20 and sized to receive the retention member 23 "nested" thereinto with slight clearance. The cross piece 22 covers the otherwise unsightly groove between the top panel and the retention member 23 and the support rim 21 bears against such top panel to support the assembly. The assembly may thereby be said to be "flush mounted" in the stove top panel.

Like the cooking plate 10, the preferred frame 20 is generally rectangular and is conveniently made by molding as a one-piece structure. The plate 10 and the frame 20 and its retention member 23 are cooperatively sized so that the retention member 23 and the perimeter portion 13 define an upwardly-opening space between them. Foam 31 substantially fills the space and adheres to the retention member 23 and to the perimeter portion 13, thereby affixing the plate 10 and the frame 20 to one another. The frame 20 includes at least one opening 25, and preferably plural openings 25, for injecting foam 31 through such frame 20 and into the space.

In a preferred embodiment, the plate 10 is spaced above the carrier member 24. The foam 31 is between the plate 10 and the carrier member 24 and adheres to the carrier member 24 and to the under surface 12 of the plate 10.

Plate 10 and carrier member 24 spacing is preferably by a sealing element 30 lodged in a groove 26 formed in the carrier member 24. The foam 31 also adheres to the sealing element 30.

Referring particularly to FIG. 1, when making the stove top assembly, it has been found desirable to use a specially-configured manufacturing tool 40 to do so. One embodiment of a preferred tool 40 has a slab-like body component and a rigid, foot-like tool support member 46 extending downwardly therefrom. The support member 46 has a support surface 45 and when the tool 40 is properly positioned, such surface 45 is substantially coplanar with the top surface 11 and spans the space. In a specific embodiment, both the space and the support member 46 circumscribe a rectangle-shaped area.

By virtue of the support member 46, the tool 40 and the cooking plate top surface 11 define a gap 44 between them. A resilient gasket 42, preferably affixed to the tool 40, is in the gap 44 and seals between the tool 40 and the top surface 11 of the cooking plate 10. In a specific embodiment, the gasket 42 also circumscribes a rectangle-shaped area. The tool 40 includes an evacuation channel 41 in air flow communication with the gap 44 and when air is evacuated from the gap 44 through the channel 41, the tool 40 (and, particularly, the support surface 45) is urged snugly against the cooking plate 10 and the retention member 23 in preparation for foam placement. When the tool 40 of FIG. 1 is used, the top surface of the foam 31 is substantially coplanar with the top surface 11 of the cooking plate 10.

Referring now to FIG. 4, in an alternate embodiment, the tool 40 includes a resilient foot member 47 extending downwardly from it and spanning the space. The perimeter portion 13 of the cooking plate 10 includes a chamfered upper edge 14 (i.e., an edge turning toward the top surface 11 of the plate 10) and the foot member 47 includes a lip 48 sealing against the chamfered upper edge 14 at a location below the plate top surface 11. In a specific arrangement, the line of lip-to-edge sealing is below the plate top surface 11 by a dimension "d," typically about 0.5 to 1.5 mm. An advantage of this arrangement is that if a hot object, for example a pot, is placed on the top surface 11 of the cooking plate 10 directly above the reactive foam 31, the air space between the pot and the foam 31 helps insulate the foam 31 from heat.

Referring to the FIGURES, a new method for making a stove top assembly includes providing the cooking plate 10 and the mounting frame 20. The cooking plate 10 is positioned in the mounting frame 20 to define the upwardly-opening space around the perimeter portion 13 and between the perimeter portion 13 and the retention member 23. Substantially all of the space is then filled with reactive adhesive foam 31, thereby affixing the cooking plate 10 and the mounting frame 20 to one another. Foam filling is preferably by one or more injection nozzles 50 with foam flowing in the direction "A" shown in FIG. 1.

A more specific method includes providing a tool 40 of the embodiment described above as having the support member 46, the support surface 45, the gasket 42 and the evacuation channel 41. The filling step is preceded by the step of placing the support surface 45 on the cooking plate top surface 11 in a position whereby the support surface 45 spans the space. Then air is evacuated from the gap 44 through the channel 41 in the direction "B" so that the support surface 45 is urged snugly against the cooking plate top surface 11 and the retention member. The space is then filled with foam 31 and the support surface 45 (coacting with the carrier member 24 and the retention member 23) constrains the foam 31 within the space.

In an alternate method, the cooking plate 10 is formed so that its perimeter portion 13 has a chamfered upper edge 14. The tool 40 has a resilient foot member 47 and lip 48 as described above. The filling step is preceded by the step of moving the tool 40 to a position such that the foot member 47 spans the space and the lip 48 contacts the chamfered upper edge 14 slightly below the top surface 11. Most preferably, the tool 40 and the top surface 11 define a gap 44 therebetween, a gasket 42 is in the gap 44 and the tool 40 includes an evacuation channel 41 in air flow communication with the gap 44, all as described above. The moving step is followed by and the filling step is preceded by the step of evacuating air through the channel 41 from the gap 44.

Other aspects of the invention recognize that, assuming the frame 20 is held in a fixturing jig or the like (not shown), the cooking plate 10 may have a propensity to move with respect to the frame 20 during foam filling or during placement of the tool 40 and foam filling. To positionally secure the cooking plate 10, the positioning step includes moving a positioning device 61 in the space and, most preferably, includes moving a plurality of positioning devices 61, e.g., four devices 61, in the space so that each device 61 abuts both the cooking plate 10 and the retention member 23 at each of four respective locations, one along each of the four linear borders of the cooking plate 10. In a highly preferred method, each positioning device 61 is coupled to a hand-manipulated slide member 60 extending through the frame 20.

Figure 3:
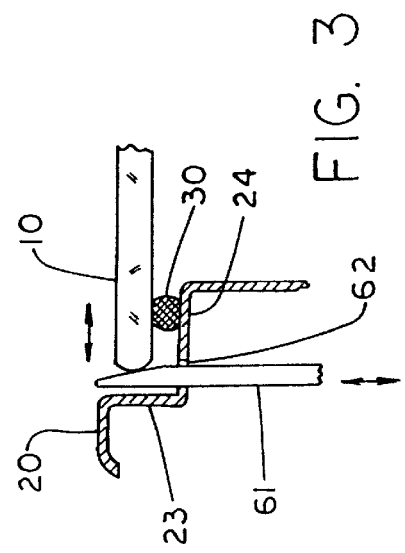
FIG. 3 is a cross-sectional elevation view of a portion of the new stove top assembly showing how the cooking plate may be positioned in the frame by means of a positioning device.

As shown in FIG. 3, an exemplary positioning device 61 is wedge-shaped so that moving such device 61 upwardly urges the plate 10 away from such device. By using opposed positioning devices 61 in pairs as shown in FIG. 2, the plate 10 may be moved in any horizontal direction and held at a position by properly manipulating one or more slide members 60. (It is certainly within the capability of one of even rudimentary skill in the art to configure an apparatus whereby a positioning device 61 and a slide member 60 are coupled together in a manner that horizontal movement of the member 60 results in vertical movement of the device 61. A pin-and-groove arrangement using slant-oriented grooves in the slide member 60 and engaging pins on the device 61 is but one example of how to do so.)

A preferred foam 31 is made of two non-foamed constituents which, when mixed, react by foaming and then hardening. A preferred foam 31 is selected from a group of reaction foams such as polyurethane, silicone, ethylene-propylene diene monomer (EPDM—a terpolymer elastomer) and polytetrafluoroethylene (PTFE) foam. Each of these foams is adhesive and permanently elastic, thereby imparting a degree of resiliency to the way the cooking plate 10 and frame 20 are secured to one another.

Moreover, such foams 31 are resistant to the usual chemicals, e.g., cleaning agents, used around stoves. The fact that the foams 31 are permanently elastic ensures that deformations in the space between the retention member 23 and the cooking plate 10 are reliably filled and that a good seal is effected.

Terms such as "top," "under," "upwardly" and the like are intended to denote positional relationships when the stove top assembly is mounted in an upright stove.

While the principles of the invention have been shown and described in connection with but a few preferred embodiments, it is to be understood clearly that such embodiments are by way of example and are not limiting.

What is claimed:

1. In a stove top assembly comprising a cooking plate having a perimeter portion and a mounting frame around the perimeter portion, the improvement wherein:

the frame includes a lateral carrier member and an upstanding retention member extending away from the carrier member;

the retention member and the perimeter portion define a confined upwardly-opening space therebetween; and a reactive foam substantially fills the space and adheres to the retention member and to the perimeter portion, thereby affixing the plate and the frame to one another.

2. The assembly of claim 1 wherein:

the plate is spaced above the carrier member; and the reactive foam is between the plate and the carrier member and adheres to the carrier member.

3. The assembly of claim 1 wherein:

the carrier member includes a groove formed therein;

a sealing element is in the groove and contacts the plate; and the reactive foam adheres to the sealing element.

4. The assembly of claim 1 wherein:

the plate includes a top surface; and the reactive foam substantially fills the space to a level below the top surface.

5. The assembly of claim 1 wherein:

the frame includes at least one opening for injecting the reactive foam therethrough.

6. The assembly of claim 1 in combination with a tool and wherein:

the plate has a top surface and an edge coincident with the perimeter portion;

the upstanding retention member has a first edge spaced from and opposite the top surface edge;

the tool has a support surface substantially coplanar with the top surface and in contact with the edge of the top surface and the first edge of the upstanding retention member, thereby spanning the upwardly-opening space between the retention member and the perimeter portion.

7. The combination of claim 6 wherein:

the support surface is on a tool support member extending downwardly from the tool;

the tool and the top surface define a gap therebetween; and a gasket is in the gap.

8. The combination of claim 7 wherein:

the tool includes an evacuation channel in air flow communication with the gap; and the gasket extends around the perimeter portion, thereby sealing the tool and the cooking plate with respect to one another.

9. The assembly of claim 1 in combination with a tool and wherein:

the plate has a top surface;

the tool includes a resilient foot member extending downwardly therefrom and spanning the space.

10. The combination of claim 9 wherein:

the perimeter portion includes a chamfered upper edge;

the foot member includes a lip sealing against the chamfered upper edge at a location below the plate top surface.

11. A method for making a stove top assembly including:

providing a cooking plate having a perimeter portion;

providing a mounting frame including a lateral carrier member and an upstanding retention member extending away from the carrier member;

positioning the cooking plate in the mounting frame to define an upwardly-opening space around the perimeter portion and between the perimeter portion and the retention member; and filling substantially all of the space with reactive adhesive foam, thereby affixing the cooking plate and the mounting frame to one another.

12. The method of claim 11 wherein the cooking plate has a top surface and the method includes:

providing a tool having a support surface;

and wherein the filling step is preceded by the step of:

placing the support surface on the cooking plate top surface in a position whereby the support surface is in contact with the cooking plate top surface and the retention member in such a manner so as to span the upwardly-opening space between the perimeter portion and the retention member.

13. The method of claim 12 wherein:

the support surface is on a tool support member extending downwardly from the tool;

the tool and the top surface define a gap therebetween;

a gasket is in the gap;

the tool includes an evacuation channel in air flow communication with the gap; and the gasket extends around the perimeter portion, thereby sealing the tool and the cooking plate with respect to one another;

and wherein the placing step is followed by and the filling step is preceded by the step of:

evacuating air from the gap through the channel.

14. The method of claim 11 wherein:

the cooking plate has a top surface;

the perimeter portion includes a chamfered upper edge;

and the method includes:

providing a tool having a resilient foot member extending downwardly therefrom and having a lip;

and wherein the filling step is preceded by the step of:

moving the tool to a position such that the foot member spans the space and the lip contacts the chambered upper edge below the top surface.

15. The method of claim 14 wherein:

the tool and the top surface define a gap therebetween;

a gasket is in the gap;

the tool includes an evacuation channel in air flow communication with the gap; and the gasket extends around the perimeter portion, thereby sealing the tool and the cooking plate with respect to one another;

and wherein the moving step is followed by and the filling step is preceded by the step of:

evacuating air through the channel from the gap.

16. The method of claim 11 wherein the positioning step includes moving a positioning device in the space.

17. The method of claim 16 wherein the cooking plate, the frame and the space are generally rectangular and moving step includes moving a plurality of positioning devices in the space.

18. The method of claim 17 wherein each positioning device is coupled to a slide member extending through the frame.

* * * * *

UNITED STATES PATENT AND TRADEMARK OFFICE
CERTIFICATE OF CORRECTION

PATENT NO. : 6,207,933 B1
DATED : March 27, 2001
INVENTOR(S) : Horst Stedron et al.

It is certified that error appears in the above-identified patent and that said Letters Patent is hereby corrected as shown below:

Column 6,
Line 38, after "preferred", insert -- reactive --.
Line 40, after "preferred", insert -- reactive --.

Column 7,
Lines 30-31, delete "has a support surface substantially coplanar with the top surface and" and insert -- includes a foot member --.

Column 8,
Line 9, delete "support surface" and insert -- foot member --.
Line 11, delete "support surface" and insert -- foot member --.
Line 12, delete "support surface" and insert -- foot member --.

Signed and Sealed this

Eighteenth Day of December, 2001

*Attest:*

JAMES E. ROGAN
*Director of the United States Patent and Trademark Office*

*Attesting Officer*